US007870208B2

(12) United States Patent
Halcrow et al.

(10) Patent No.: US 7,870,208 B2
(45) Date of Patent: *Jan. 11, 2011

(54) DYNAMIC READER-INSTIGATED CATEGORIZATION AND DISTRIBUTION RESTRICTION OF MAILING LIST THREADS

(75) Inventors: Michael Austin Halcrow, Pflugerville, TX (US); Dustin Kirkland, Austin, TX (US); Emily Jane Ratliff, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 12/060,663

(22) Filed: Apr. 1, 2008

(65) Prior Publication Data

US 2008/0183834 A1   Jul. 31, 2008

Related U.S. Application Data

(63) Continuation of application No. 11/011,250, filed on Dec. 14, 2004, now Pat. No. 7,548,953.

(51) Int. Cl.
  *G06F 15/16* (2006.01)
(52) U.S. Cl. .................................... 709/206; 709/207
(58) Field of Classification Search ................ 709/206, 709/207
See application file for complete search history.

(56) References Cited

U.S. PATENT DOCUMENTS

| 6,453,338 B1* | 9/2002 | Shiono .................... 709/206 |
| 2001/0032247 A1* | 10/2001 | Kanaya ..................... 709/206 |
| 2002/0026485 A1* | 2/2002 | Sugawara ................... 709/206 |
| 2004/0128355 A1* | 7/2004 | Chao et al. ................. 709/206 |
| 2006/0075040 A1* | 4/2006 | Chmaytelli ................. 709/206 |

* cited by examiner

*Primary Examiner*—Firmin Backer
*Assistant Examiner*—Michael A Chambers
(74) *Attorney, Agent, or Firm*—Dillon & Yudell LLP

(57) ABSTRACT

A method of regulating electronic message traffic is proposed. The method comprises sending an electronic message as part of a thread, receiving a response to the message, and tabulating said response in a counter. A data processing system compares the counter to a threshold and, in response to the comparing step, designates the thread as off-topic.

19 Claims, 4 Drawing Sheets

DYNAMIC READER-INSTIGATED CATEGORIZATION AND DISTRIBUTION RESTRICTION OF MAILING LIST THREADS

CROSS-REFERENCE TO RELATED APPLICATIONS

The present application is a continuation of U.S. patent application Ser. No. 11/011,250, filed on Dec. 14, 2004 now U.S. Pat. No. 7,548,953, entitled "Method and System for Dynamic Reader-Instigated Categorization and Distribution Restriction on Mailing List Threads". Applicants claim benefit of priority under 35 U.S.C. §120 to U.S. patent application Ser. No. 11/011,250, which is incorporated by reference herein in its entirety and for all purposes.

BACKGROUND OF THE INVENTION

1. Technical Field

The present invention relates in general to data processing and in particular to improving utility of threaded email lists. Still more particularly, the present invention relates to a system, method and computer program product for regulating message traffic on threaded email lists.

2. Description of the Related Art

The advent of electronic mail has enabled a host of new methods of inexpensive communication. When discussing the advantages of e-mail, most users envision e-mail in its most basic form, which is the communication of text messages from an individual user to another individual user. This ability to deliver text messages has revolutionized interpersonal communications, both for business and for personal data content.

The availability of ubiquitous, low-cost, electronic messaging has enabled a host of spin-off applications. While the simple mail transfer protocol (SMTP) has enabled users to communicate with each other individually, additional mass-communication functionalities have arisen from related applications such as listserv. Listserv, and other similar products, operate on the principal of allowing an individual user to send to a pre-defined list of other users. The overall concept of listserv is that an individual user sends a message once to a server. Upon receipt of the individual user's message, the server then resends the message to a pre-defined list of users.

Most listserv user lists are dedicated to interest-specific topics. For example, a listserv will be dedicated to a specific neighborhood group or alumni of a specific college. The predefined list of a listserv community, which often have well-defined common interest allow an individual user to direct a message to a group of like-minded users cost effectively and with great speed. The sending user is therefore insured of a reasonable expectation that the receiving users will have interest in messages related to the topic of the listserv.

This sense of community of common interest which makes the listserv so useful, is also the basis of a great weakness of listserv technology. The weakness arises from listserv's common strength, the common interest and sense of community among the users. Over time, many listservs degenerate into off-topic discussion as users identify the tangential common interests of the user list, which are not related to the subject of the list.

This devolution of the listserv content creates a choking traffic in messages, and, while dedicated to some of the common interests of some members of the list, threatens the utility of the list by diluting the on-topic content of the list with a tremendous amount of off-topic content that is only marginally or tangentially related to the list. As time progresses, the ability of the listserv to transmit useful information dedicated to its intended topic is diminished as regular subscribers develop a frustration with the off-topic posts. What is needed is a way for list subscribers to efficiently identify off-topic threads and to seamlessly filter future posts made on those threads.

SUMMARY OF THE INVENTION

A method of regulating electronic message traffic is proposed. The method comprises sending an electronic message as part of a thread, receiving a response to the message, and tabulating said response in a counter. A data processing system compares the counter to a threshold and, in response to the comparing step, designates the thread as off-topic.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

The present invention provides a method, system and computer program product for regulating message traffic by employing mailing list server software equipped with the capability to tabulate votes received relative to messages within specific threads sent to the mailing list. Filtering is driven by subscribers to the mailing list sending votes with respect to an off-topic thread to a vote tabulator through email clients, which can be extended to perform this operation. Once a threshold number of votes against a particular thread has been reached, the mailing list server could notify subscribers that a thread has been listed as off-topic and that a further request for the thread will be required to continue access to the thread.

The present invention has several advantages over existing filtering solutions. First, it distributes the duty of identification of the off-topic thread among subscribers. Second, it centralizes processing of off-topic thread tabulation so that each subscriber is not required to create his own filtering mechanism. Third, the present invention conserves bandwidth and processing power by stopping off-topic traffic at a mail server. Fourth, the present invention also provides a dynamic filtering system that does not clutter e-mail clients with short duration filtering rules.

Figure 1:
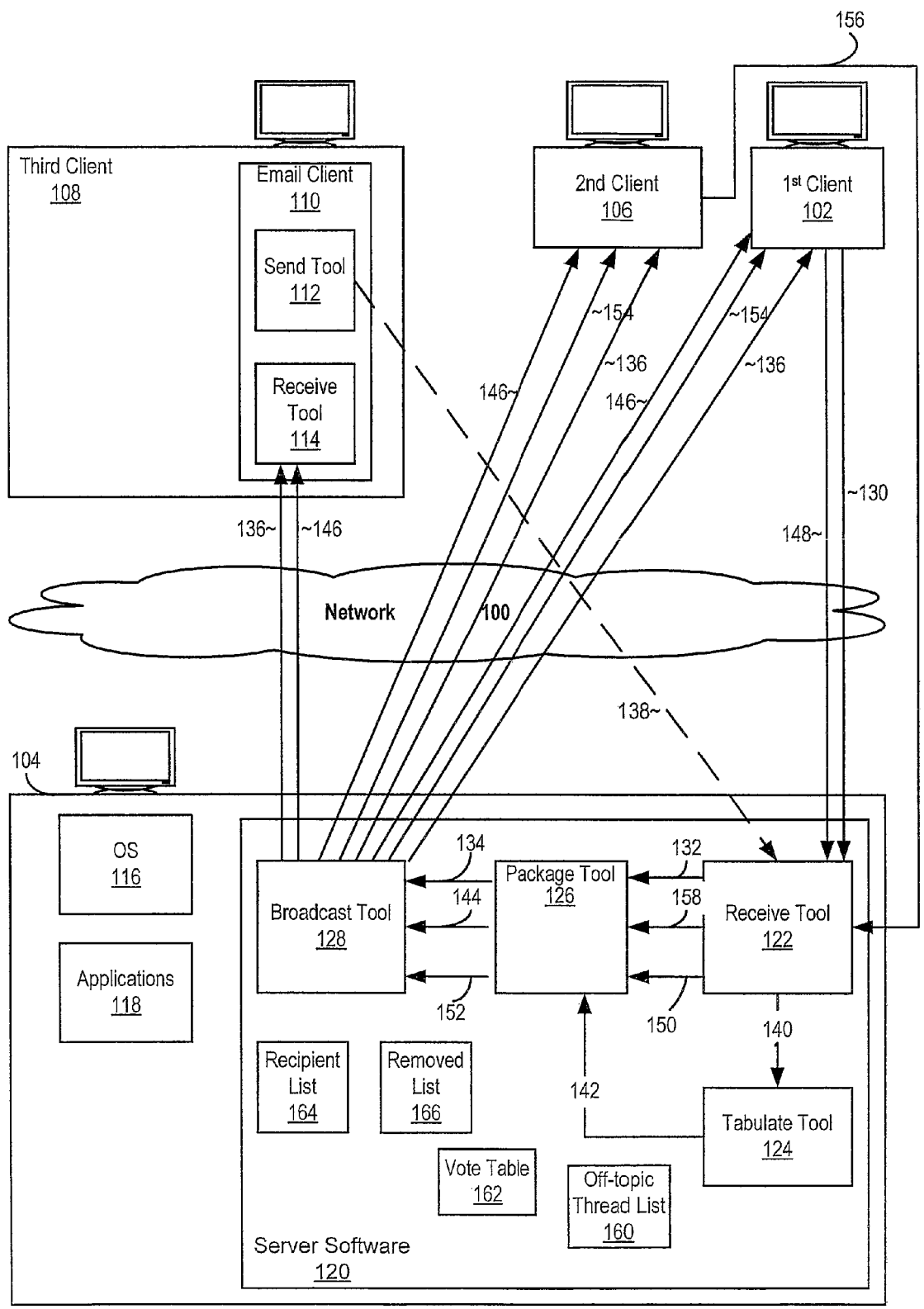
FIG. 1 depicts a block diagram of a network environment including data processing systems equipped with computer program products for regulating message traffic in accordance with a preferred embodiment of the present invention.

With reference now to the figures and in particular with reference to FIG. 1, a block diagram of the network environment including data processing systems equipped with computer program products for regulating message traffic in accordance with a preferred embodiment of the present invention is depicted. The network environment depicted in FIG. 1 includes network 100 for transmitting messages between first client 102, server 104, second client 106 and third client 108. Each of first client 102, second client 106 and third client 108 contains an e-mail client, such as e-mail client 110 in third client 108. E-mail client 110 contains a send tool 112 and a receive tool 114. Receive tool 114 is used for receiving messages from server 104, send tool 112 is used for sending messages to server 104.

Server 104 contains an operating system 116, applications 118 and server software 120. In the present invention, server software 120 contains a receive tool 122, a tabulate tool 124, a package tool 126 and a broadcast tool 128. Receive tool 122 receives messages from first client 102, second client 106 and third client 108 and also handles the message receiving functions of the present invention. Packaging tool 126 prepares messages for delivery to first client 102, second client 106 and third client 108 by broadcast tool 128.

The present invention involves the sending of several messages, as depicted in FIG. 1. First among these, first client 102 sends first listserv candidate message 130 to receive tool 122 on server 104. Receive tool 122 sends a first content distribution message 132 to package tool 126. Package tool 126 sends a first packaged message 134 to broadcast tool 128. Broadcast tool 128 then sends a first listserv broadcast 136 to each of first client 102, second client 106 and third client 108. At third client 108, receive tool 114 on e-mail client 110 receives first broadcast message 136. In response to first broadcast message 136, send tool 112 on e-mail client 110 of third client 108 sends protest message 138 to receive tool 122. Receive tool 122 sends a tabulate message 140 to tabulate tool 124. A protest message, such as protest message 138, will typically be sent in response to a particular message on a thread.

Tabulate tool 124 is further capable of sending an off-topic notification 142 to package tool 126. Whenever an off-topic notification 142 is received by package tool 126, package tool 126 sends a de-listing notification 144 to broadcast tool 128. Broadcast tool 128 then sends a removal notice 146 to receive tool 114 on e-mail client 110 of third client 108. Removal notice 146 is also sent by broadcast tool 128 to first client 102 and second client 106. In response to removal notice 146, second client 106 can choose to send a resubscribe message 156 to receive tool 122 on server software 120 of server 104. Receive tool 122 sends a resubscribe notice 158 to package tool 126.

Subsequently, when first client 102 sends second listserv candidate message 148 to receive tool 122 on server software 120 of server 104, receive tool 146 sends second content distribution message 150 to package tool 126. Package tool 126 sends restricted broadcast message 152 to broadcast tool 128. Broadcast tool 128 sends second listserv broadcast 154 to first client 102 and second client 106, but not to third client 108.

Further, the present invention uses and server software 120 maintains several data structures. Server software 120 maintains off-topic thread list 160, which contains a list of all threads that have tabulate tool has determined to be off-topic. Server software 120 also maintains recipient list 164, containing addresses of all recipients of a given listserv and removed list 166, containing addresses of all recipients of a given listserv who have opted to resubscribe to a particular thread. Finally, server software 120 maintains a vote table 162, containing a table correlating the number of protests received on each of several threads and a list of email addresses of protesting clients. All tools listed above may be implemented as part of a single software program or as independent processes. Additionally, in alternative environments, some processing functions listed as occurring on server 120 may be executed on individual clients.

Figure 2A:
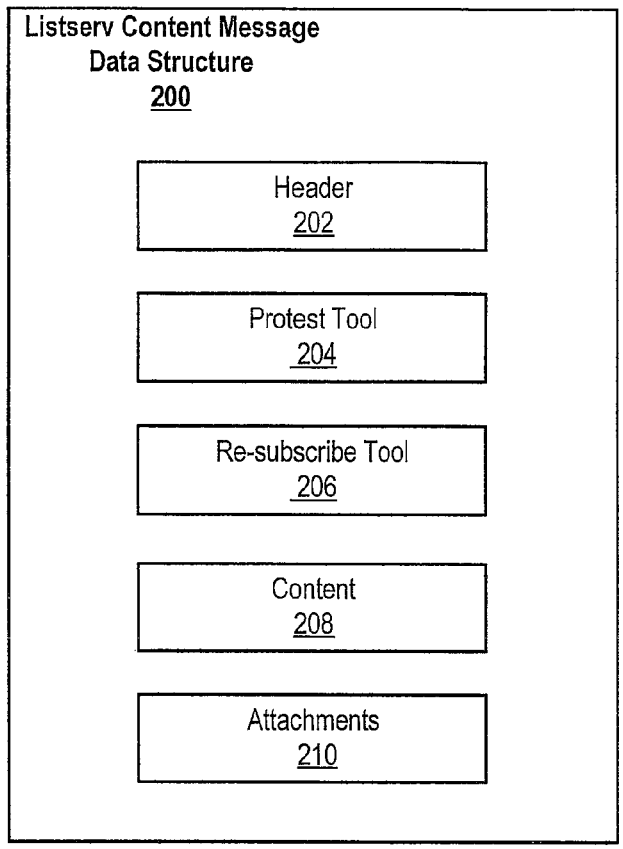
FIG. 2A illustrates a block diagram of a listserv content message data structure with substructures for regulating message traffic in accordance with a preferred embodiment of the present invention.

Turning now to FIG. 2A, a block diagram of a listserv content message data structure with substructures for regulating message traffic in accordance with a preferred embodiment of the present invention is depicted. Listserv content message data structure 200 is represented in FIG. 1 as first listserv broadcast 136 and second listserv broadcast 154. Listserv content message data structure 200 contains a header 202, a protest tool 204, a re-subscribe tool 206, content 208 and, optionally, one or more attachments 210.

Header 202 contains routing information for transmission of message 200 across network 100 by broadcast tool 128. On most mailing lists, threads have a unique thread identifier in the email headers. An example of content from header 202, many of the components of which are well known to those skilled in the art, could contain information as listed below:

---

Date: Tue, 30 Nov 2004 16:05:38 -0700
From: Firstname Lastname <userid@domain.topleveldomain>
Subject: RE: [listserv name] very interesting mail
Sender: listname-list-bounces@listserver.domain.topleveldomain
To: List Name < listname-list@ listserver.domain.topleveldomain >
Errors-to: listname-list-bounces@ listserver.domain.topleveldomain
Reply-to: List Name < listname-list@ listserver.domain.topleveldomain >
Message-id: <8C7BA7940746324BA6DFF77AAC3A4D607798@ userid@domain.topleveldomain >
MIME-version: 1.0
X-MIMEOLE: Produced By Program V6.5.6944.0
Content-type: text/plain; charset=us-ascii
Content-transfer-encoding: quoted-printable
Precedence: list
Thread-Topic: [listserv name] very interesting email
thread-index: AcTXDucZQRqZYu6rTTqJ7eJyGAvVggAIg8hA
Content-class: urn:content-classes:message
X-BeenThere: listname-list@ listserver.domain.topleveldomain
X-Mailman-Version: 2.1.4
List-Post: < listname-list@ listserver.domain.topleveldomain >
List-Subscribe: <http://url.listname.domain.topleveldomain/cgi-bin/mailman/listinfo/listname-list>,
    <mailto:listname-list-request@domain.topleveldomain?subject=subscribe>
List-Unsubscribe: <http://url.listname.domain.topleveldomain/cgi-bin/mailman/listinfo/listname-list>,
    <mailto: listname-list-request@domain.topleveldomain?subject=unsubscribe >
List-Archive: <http:// url.listname.domain.topleveldomain/pipermail/listname-list>
List-Help: <mailto:listname-list-request@domain.topleveldomain?subject=help>
List-Id: List name <listname-list@domain.topleveldomain >
---

A preferred embodiment will make particular use of the "Thread-Topic" and "thread-index" lines:

```
---
Thread-Topic: [listserv name] very interesting email
thread-index: AcTXDucZQRqZYu6rTTqJ7eJyGAvVggAIg8hA
---
```

In a preferred embodiment, the "Thread-Topic" and "thread-index" lines are used as unique identifiers for threads; messages can be associated with threads through these identifiers in the headers. The off-topic marker can simply take the form of an email header. Three variations for a preferred embodiment are:

```
---
Thread-Topic: [listname] very interesting email
thread-index: AcTXDucZQRqZYu6rTTqJ7eJyGAvVggAIg8hA
Off-Topic: No
---
Thread-Topic: [listname] very interesting email
thread-index: AcTXDucZQRqZYu6rTTqJ7eJyGAvVggAIg8hA
Off-Topic: Yes, branch_votes=7
---
Thread-Topic: [listname] very interesting email
thread-index: AcTXDucZQRqZYu6rTTqJ7eJyGAvVggAIg8hA
Off-Topic: Suspect
---
```

In the variations given above, branch_votes is the number of off-topic votes given against all of the messages under a given thread root. In some alternative embodiments, email client 110 can categorize the message based on the Off-Topic header. Of course, list subscribers can, as detailed below, request that server software 120 not withhold messages that earn the "Off-Topic: Yes" header.

Protest tool 204 contains instructions, executable by send tool 112 of email client 110, for sending protest message 138 to receive tool 122 on server 104. Re-subscribe tool 206 contains instructions, executable by send tool 112 of email client 110, to send an automatic re-subscribe message. An automatic resubscribe message is equivalent to resubscribe message 156, but is capable of being sent prior to receiving removal notice 146. When a resubscribe message 156 is received, server software 120 will add the address of the sending client to removed list 166. Content 208 contains textual and/or graphical message content, such as that received in first listserv candidate message 130. Attachments 210 may comprise one or more textual, graphical, and or data files, which may be received in first listserv candidate message 130.

Figure 2B:
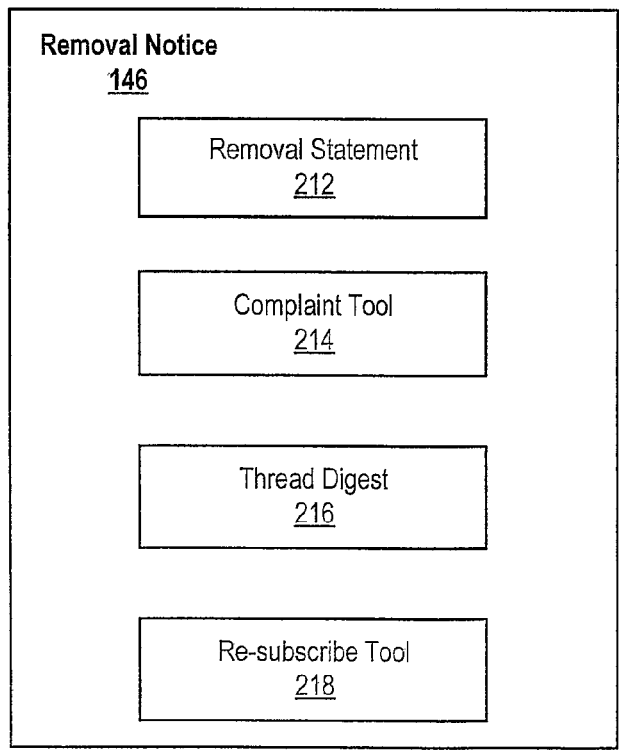
FIG. 2B depicts a block diagram of a listserv notice message data structure with substructures for regulating message traffic in accordance with a preferred embodiment of the present invention.

With reference now to FIG. 2B, a block diagram of listserv removal notice message data structure with substructures for regulating message traffic in accordance with a preferred embodiment of the present invention is depicted. Removal notice 146 contains removal statement 212, complaint tool 214, thread digest 216 and re-subscribe tool 218. Removal statement 212 contains data (e.g. an auto-generated text message) informing the user that a thread has been declared off-topic and removed, and contains textual instructions for using complaint tool 214, thread digest 216 and re-subscribe tool 218. Complaint tool 214 contains instructions for send tool 112 to protest listing of a particular listing is off-topic. Thread digest 216 contains a digest of all messages listed on the current thread. Re-subscribe tool 218 contains instructions, executable by send tool 112 of email client 110, to send a re-subscribe message 156.

Figure 3:
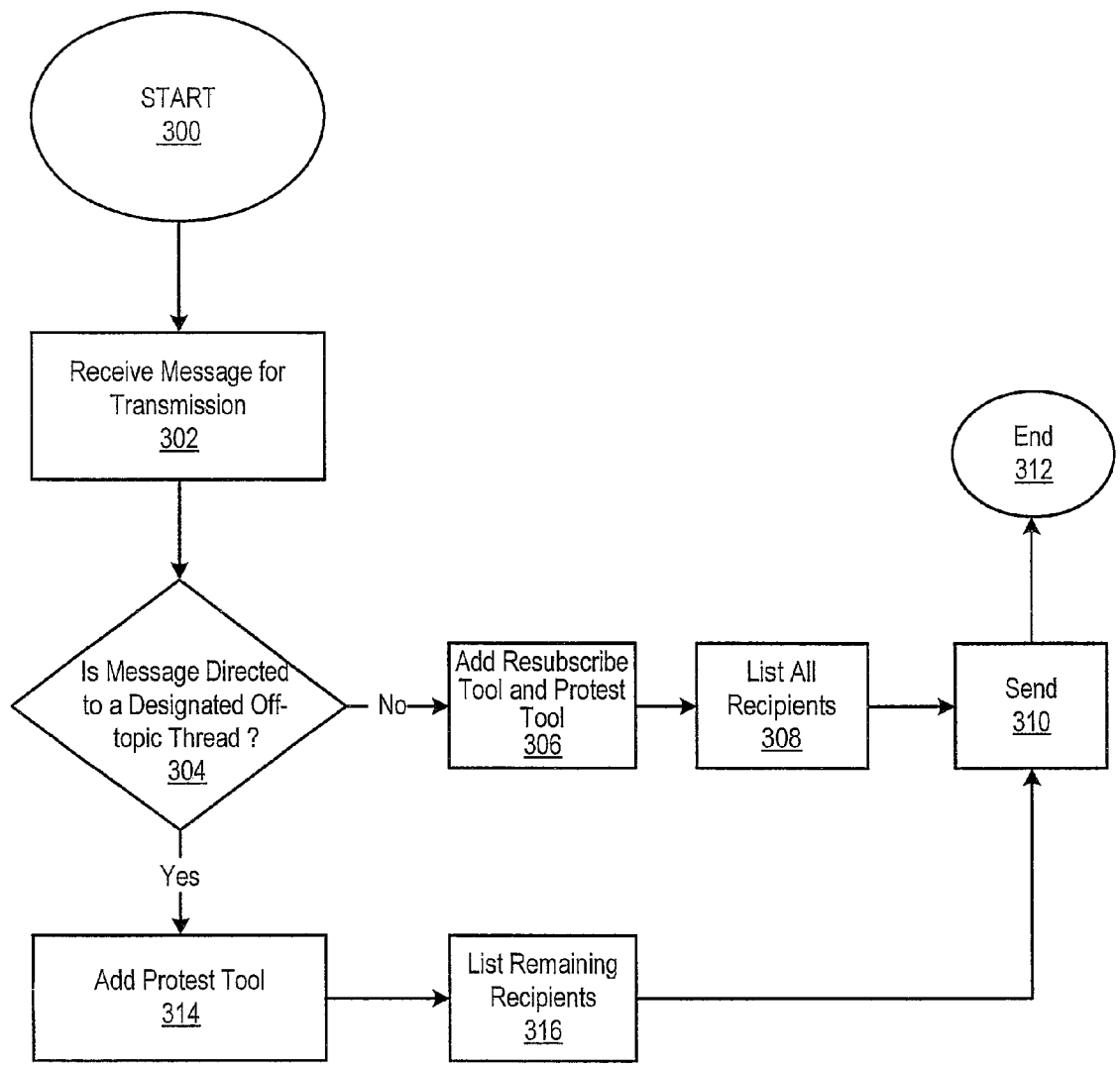
FIG. 3 is a high level logical flowchart of a method for filtering, packaging, and sending messages to regulate message traffic in accordance with a preferred embodiment of the present invention.

Turning now to FIG. 3, a high-level logical flowchart of a method for filtering, packaging and sending messages to regulate message traffic in accordance with a preferred embodiment of the present invention is depicted. The process depicted in FIG. 3 embodies a series of decisions and actions that will facilitate the processing of a message received from a client for transmission to other clients through server software 120. The process starts at step 300. The process then moves to step 302, which depicts receive tool 122 on server software 120 of server 104, receiving a message for broadcast transmission, such as first listserv candidate message 130 or second listserv candidate message 148. The process next moves to step 304. At step 304, receive tool 122 on server software 120 of server 104 determines whether the message received in step 302 is directed to a designated off-topic thread by comparing the topic of the message received in step 302 to off-topic thread list 160.

Off-topic thread list 160 will contain a listing of threads, which threads can contain both on-topic and off-topic messages. Off-topic messages tend to start at the root of one branch, while other branches may contain on-topic messages. Some embodiments of the present invention may utilize off-topic branch roots be the basis for future replies to messages under that root. An example of off-topic thread list 160 is given below, where Y=off-topic, N=on-topic, S=suspect.

| 3035 | Oct 14 | Jonathon Zapter (31) | N [uug] dvd project |
| 3036 | Oct 14 | Danil Dephouru (70) | N \|-> |
| 3037 | Oct 14 | Spencer Smitt (57) | N \|-> |
| 3038 | Oct 15 | Larry Rusnucci (14) | N \| \|-> |
| 3039 | Oct 15 | Hanry Wadslo (41) | N \| \| \|-> |
| 3040 | Oct 15 | James Hatfeeld (21) | N \| \|-> |
| 3041 | Oct 15 | Larry Rasnucci (20) | N \|-> |
| 3042 | Oct 15 | Yodel Tokna (48) | N \| \|-> |
| 3043 | Oct 15 | Brianne Warck (15) | N \| \|-> |
| 3044 | Oct 15 | Jamisen Quint (95) | N \|-> |

In the example above, if message 3037 is voted off-topic, then a tabulate tool 124 will label messages 3038, 3039, and 3040 automatically as off-topic, and the entire thread rooted at message 3035 is called into suspicion. The updated status of off-topic thread list 160 is given below:

| 3035 | Oct 14 | Jonathon Zapter (31) | S [uug] dvd project |
| 3036 | Oct 14 | Danil Dephouru (70) | S \|-> |
| 3037 | Oct 14 | Spencer Smitt (57) | Y \|-> |
| 3038 | Oct 15 | Larry Rusnucci (14) | Y \| \|-> |
| 3039 | Oct 15 | Henry Wadslo (41) | Y \| \| \|-> |
| 3040 | Oct 15 | James Hatfeeld (21) | Y \| \|-> |
| 3041 | Oct 15 | Larry Rusnucci (20) | S \|-> |
| 3042 | Oct 15 | Yodel Tokna (48) | S \| \|-> |
| 3043 | Oct 15 | Brianne Warck (15) | S \| \|-> |
| 3044 | Oct 15 | Jamisen Quint (95) | S \|-> |

If message 3041 is voted on-topic, then 3042 and 3043 are automatically categorized as on-topic. Message 3044 is continued to be flagged as suspect, and individual recipients can decide how they wish to treat suspect messages when received. The updated status of off-topic thread list 160 is given below:

| 3035 | Oct 14 | Jonathon Zapter (31) | S [uug] dvd project |
| 3036 | Oct 14 | Danil Dephouru (70) | S |-> |
| 3037 | Oct 14 | Spencer Smitt (57) | Y |-> |
| 3038 | Oct 15 | Larry Rusnucci (14) | Y | |-> |
| 3039 | Oct 15 | Henry Wadslo (41) | Y | | |-> |
| 3040 | Oct 15 | James Hatfeeld (21) | Y | |-> |
| 3041 | Oct 15 | Larry Rusnucci (20) | N |-> |
| 3042 | Oct 15 | Yodel Tokna (48) | N | |-> |
| 3043 | Oct 15 | Brianne Warck (15) | N | |-> |
| 3044 | Oct 15 | Jamisen Quint (95) | S |-> |

In an alternative embodiment, as votes come in, the status of the messages in the thread can change. Mail clients can be configured to stay up-to-date by requesting status updates from the mailing list server. If clients cannot do so, then they can at least know when they have received messages that are sent under a flagged root (e.g. 3037) and take appropriate action.

If receive tool 122 on server software 120 of server 104 determines that the message received at step 302 is not directed to a designated off-topic thread, then the process next moves to step 306. At step 306, server software 120 adds protest tool 204 and re-subscribe tool 206 to the message received in step 302. This addition is accomplished in several steps. First, receive tool 122 sends first content distribution message 132 to package tool 126 for packaging. Package tool 126 then creates listserv content message data structure 200 by combining content 208 and attachments 210 received in first content distribution message 132 with header 202, protest tool 204 and re-subscribe tool 206. The process then moves to step 308, which depicts package tool 126 on server software 120 of server 104 listing all available recipients to receive the message received in step 302. This listing of recipients is accomplished by inserting into header 202 a list of all available recipients who are members of the appropriate listserv.

The process next proceeds to step 310. At step 310, server software 120 on server 104 sends the message received for transmission in step 302. The sending step is accomplished in multiple steps. First, package tool 126 sends first package message 134 containing listserv content message data structure 200 to broadcast tool 128. Broadcast tool 128 then transmits first listserv broadcast 136 across network 100 to each member of the listserv (e.g., first client 102, second client 106 and third client 108). The process then ends at step 312.

Returning to step 304, if receive tool 122 on server software 120 to server 104 determines that the message received at step 302 is an off-topic message, then the process next moves to step 314, which depicts server software 120 adding protest tool 204 to the message received in step 302. This addition is accomplished in several steps. First, receive tool 122 sends second content distribution message 150 to package tool 126 for packaging. Next, package tool 126 creates listserv content message data structure 200 by combining content 208 and attachments 210 received in first content distribution message 132 with header 202 and protest tool 204.

The process then proceeds to step 316, which depicts server software 120 listing the remaining recipients. This listing of recipients is accomplished by inserting into header 202 a list of all remaining recipients who are members of the appropriate listserv and have sent a resubscribe message 156 (as listed in removed table 162) with reference to a the thread containing the message. The process then moves to step 310, which is described above.

Figure 4:
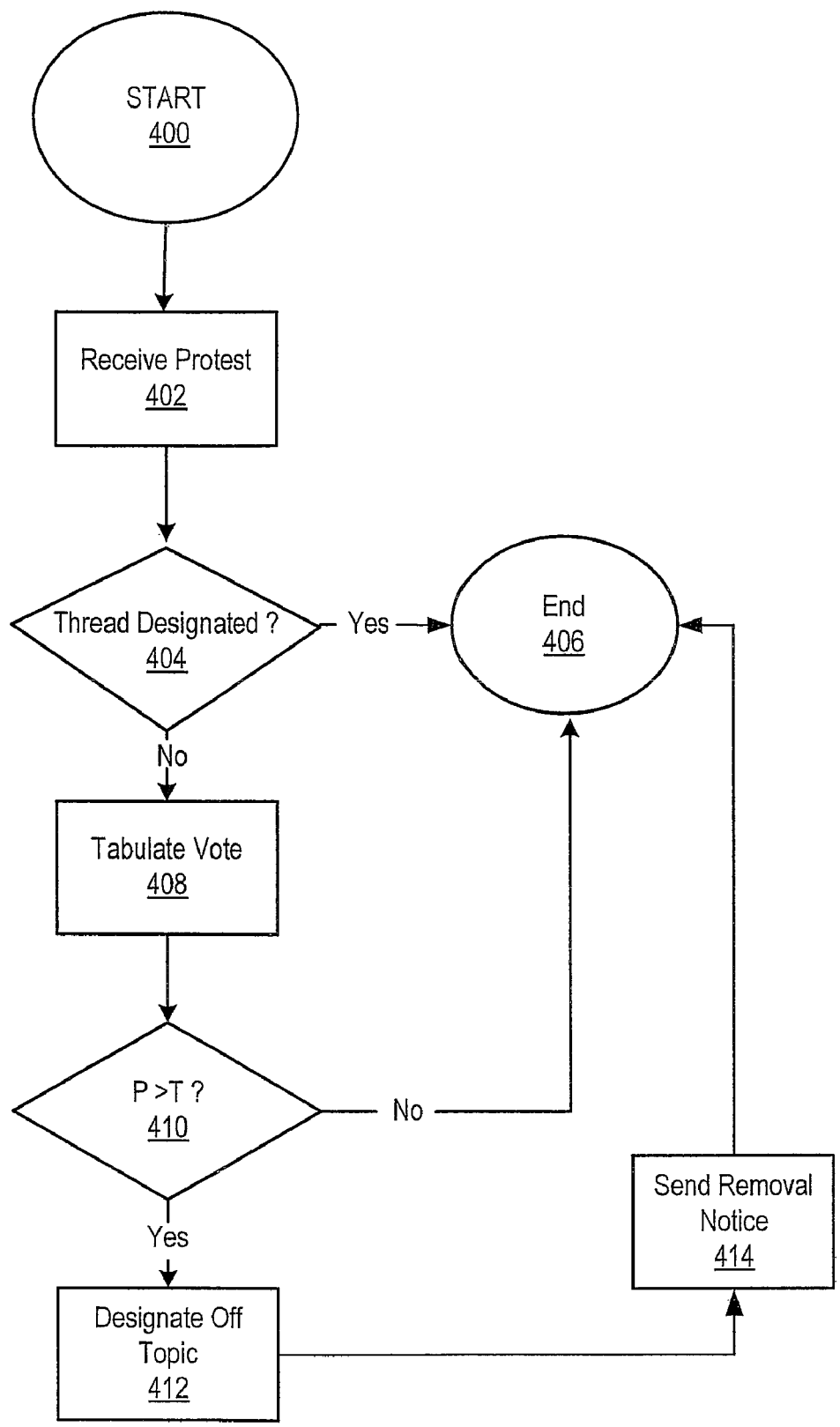
FIG. 4 is a high level logical flowchart of a method for tabulating results and sending notices to regulate message traffic in accordance with a preferred embodiment of the present invention.

With reference now to FIG. 4, a high-level logical flowchart of a method for tabulating results and sending notices to regulate message traffic in accordance with a preferred embodiment of the present invention is depicted. The process depicted in FIG. 4 embodies a series of decisions and actions that will facilitate the processing of protest messages received from a client by server software 120 and the designation of threads as being off-topic. The process starts at step 400. The process then moves to step 402, which depicts receive tool 122 of server software 120 on server 104 receiving a protest in the form of protest message 138 from send tool 112 on third client 108. Protest message 138 from send tool 112 on third client 108 will have been generated by a user, dissatisfied with the content of a thread, by executing the instructions contained in protest tool 204 in listserv content message data structure 200 The process then moves to step 404.

At step 404, server software 120 determines if the protest received in step 402 applies to a thread already designated as off-topic. This determination is accomplished by sending a tabulate message 140 containing all of the content of protest message 138 to tabulate tool 124. Tabulate tool 124 then examines the content of tabulate message 140 and compares the thread designated in tabulate message 140 to off-topic thread list 160, which contains an internal list of designated off-topic threads. If, in step 404, server software 120 determines that protest message 138 applies to a designated off-topic thread, then the process ends at step 406. If, at step 404, server software 120 determines that the protest message 138 does not apply to a designated off-topic thread, then the process moves to step 408.

At step 408, protest message 138 is tabulated by recording and counting protest message 138. The process then moves to step 410 at which tabulate tool 124 determines whether the number of protest messages P, stored in vote table 162 is greater than a configurable threshold T. If P is not greater than T, then the process ends at step 406. If P is greater than T, then the process moves to step 412, which depicts tabulate tool 124 designating the thread referenced by protest message 138 as being an off-topic thread. The value of T can be user-configured depending on the tolerance of listserv users for off-topic threads. In a preferred embodiment, T will typically be configured to represent a selected percentage the subscriber base of a given listserv. In other embodiments, T may represent an absolute number of users. The process then moves to step 414, which depicts server software 120 sending a removal notice 146 to first client 102, second client 106 and third client 108. The sending of a removal notice 146 is accomplished by tabulate tool 124 sending an off-topic notification 142 to package tool 126. Package tool 126 then sends a de-listing notification 144 to broadcast tool 128. Broadcast tool 128 then sends a removal notice 146 to first client 102, second client 106, and third client 108 and adds the thread to off-topic thread list 160.

As it has been disclosed herein, the present invention requires resubscription of a user after a thread is designated as being off topic. Alternative embodiments of the present invention may further allow a user to unsubscribe from a thread by protesting against the thread, without regard to whether other users have designated the thread off-topic. Further, as it has been disclosed herein, the present invention applies to listserv software, but one skilled in the art will quickly realize that the present invention applies equally to all threaded reflector or threaded forwarding-based messaging software.

The advent of electronic mail has enabled a host of new methods of inexpensive communication. When discussing the advantages of e-mail, most users envision e-mail in its most basic form, which is the communication of text messages from an individual user to another individual user. This ability to deliver text messages has revolutionized interpersonal communications, both for business and for personal data content. The present invention relates to a system, method and computer program product for regulating message traffic on threaded email lists.

The present invention has several advantages over existing filtering solutions. First, it distributes the duty of identification of the off-topic thread among subscribers. Second, it centralizes processing of off-topic thread tabulation so that each subscriber is not required to create his own filtering mechanism. Third, the present invention conserves bandwidth and processing power by stopping off-topic traffic at a mail server. Fourth, the present invention also provides a dynamic filtering system that does not clutter e-mail clients with short duration filtering rules.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method of regulating message traffic, said method comprising: sending a first message as part of a thread, said first message including a toolset including multiple tools that are each executable by a client receiving the first message to regulate message traffic; in response to receiving at least one response to said first message, designating said thread as off-topic; in response to receipt of a second message for transmission, determining if said second message is directed to the thread designated as off-topic, and if so, packaging the second message with a more limited toolset than the first message, wherein the more limited tool set includes at least one tool executable by a client receiving the second message to regulate message traffic; and thereafter, sending the second message.

2. The method of claim 1, further comprising sending notice to one or more thread recipients that said thread is off-topic.

3. The method of claim 1, wherein said sending said second message comprises sending the second message to a more limited subset of one or more previous thread recipients.

4. The method of claim 1, wherein said sending said second message comprises sending said second message to a complete set of one or more previous thread recipients.

5. The method of claim 1, wherein said more limited tool set comprises a voting tool.

6. The method of claim 1, wherein said more limited tool set comprises a re-subscribe tool.

7. The method of claim 2, wherein sending said notice further comprises including a re-subscribe tool in said notice.

8. A system for regulating message traffic, said system comprising: means for sending a first message as part of a thread, said first message including a toolset including multiple tools that are each executable by a client receiving the first message to regulate message traffic; means, responsive to receiving at least one response to said first message, designating said thread as off-topic; means, responsive to receipt of a second message for transmission, for determining if said second message is directed to the thread designated as off-topic, and if so, for packaging the second message with a more limited toolset than the first message, wherein the more limited toolset includes at least one tool executable by a client receiving the second message to regulate message traffic; and means for thereafter sending the second message.

9. The system of claim 8, further comprising means for sending notice to one or more thread recipients that said thread is off-topic.

10. A computer program product comprising: a non-transitory computer-readable storage medium; program code stored within the non-transitory computer-readable storage medium that when executed by a computer cause the computer to perform: sending a message as part of a thread, said first message including a toolset including multiple toes that are each executable by a client receiving the first message to regulate message traffic; in response to receiving at least one response to said first message designating said thread as off-topic; in response to receipt of a second message for transmission, determining if said second message is directed to the thread designated as off-topic, and if so, packaging the second message with a more limited toolset than the first message, wherein the more limited tool set includes at least one tool executable by a client receiving the second message to regulate message traffic; and thereafter, sending the second message.

11. The computer program product of claim 10, wherein the program code further causes the computer to send notice to one or more thread recipients that said thread is off-topic.

12. The system of claim 8, wherein means said sending said second message comprises means for sending the second message to a more limited subset of one or more previous thread recipients.

13. The system of claim 8, wherein said more limited tool set comprises a voting tool.

14. The system of claim 8, wherein said more limited tool set comprises a re-subscribe tool.

15. The system of claim 9, wherein said notice includes a re-subscribe tool.

16. The computer program product of claim 10, wherein said sending said second message comprises sending the second message to a more limited subset of one or more previous thread recipients.

17. The computer program product of claim 10, wherein said more limited tool set comprises a voting tool.

18. The computer program product of claim 10, wherein said more limited tool set comprises a re-subscribe tool.

19. The computer program product of claim 11, wherein said notice includes a re-subscribe tool.

* * * * *